UNITED STATES PATENT OFFICE.

PHILIP H. HOLMES, OF GARDINER, MAINE.

LUBRICANT BEARING.

SPECIFICATION forming part of Letters Patent No. 412,849, dated October 15, 1889.

Application filed March 6, 1889. Serial No. 302,125. (No specimens.)

*To all whom it may concern:*

Be it known that I, PHILIP H. HOLMES, of Gardiner, in the county of Kennebec and State of Maine, have invented certain new and useful Improvements in Composition of Matter for Lubricating Surfaces; and I do hereby declare the following to be a full, clear, and exact description of the invention, such as will enable others skilled in the art to which it appertains to make and use the same.

My invention relates to a self-lubricating composition of matter for journal-bearings and similar bearing-surfaces.

The object is to provide such a substance as can be produced at a reasonable rate, consisting of few ingredients, and, above all, a material which shall be self-lubricating.

With this end in view my invention consists in certain ingredients, combined as herein set forth.

In carrying out my invention I take fiber, preferably wood or vegetable fiber, and add to it a lubricant, preferably plumbago. The fiber and lubricant are thoroughly mixed in water, with a small quantity of sulphuric acid, just sufficient to make it a little acid to the taste. In some articles—for instance, cogs—sufficient sizing is added to harden and strengthen the composition; but for journal-boxes I prefer to omit the sizing. The proportions of the ingredients will vary somewhat in different articles; but for journal-boxes I find that four pounds of plumbago to one pound of fiber give good results. The composition in its plastic condition is placed in a mold having openings therein for the escape of the water held in the composition, and is subjected to powerful pressure, which expels the water and shapes the mass. After the article has been subjected to the required pressure it is removed from the press and dried. The plumbago in the composition furnishes the lubricant, while the fiber, which is thoroughly incorporated with the plumbago, gives the mass strength and holds it in shape. Out of this material I propose to make cogs for mortise-gear, instead of making them out of wood. It can also be formed into steps for water-wheels, journals for boxes and wagons, and for all similar bearing-surfaces where there is frictional contact.

Having fully described my composition, what I claim as new, and desire to secure by Letters Patent, is—

1. The herein-described composition of matter, consisting of plumbago, combined with wood fiber, in substantially the proportion specified, to form one homogeneous mass, substantially as set forth.

2. The herein-described composition of matter, consisting of plumbago, wood fiber, and sulphuric acid, substantially as set forth.

3. The herein-described composition of matter, consisting of plumbago, combined with wood fiber, sulphuric acid, and sizing, substantially as set forth.

In testimony whereof I have signed this specification in the presence of two subscribing witnesses.

PHILIP H. HOLMES.

Witnesses:
ALBERT M. SPEAR,
OLIVER B. CLASON.